US012560582B2

(12) United States Patent
Katsuyama et al.

(10) Patent No.: US 12,560,582 B2
(45) Date of Patent: Feb. 24, 2026

(54) CHROMATOGRAPHIC ANALYZER AND PROGRAM FOR CHROMATOGRAPHIC ANALYSIS

(71) Applicant: SHIMADZU CORPORATION, Kyoto (JP)

(72) Inventors: Yuji Katsuyama, Kyoto (JP); Kiriko Matsuo, Kyoto (JP); Rikito Marumoto, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 698 days.

(21) Appl. No.: 18/088,051

(22) Filed: Dec. 23, 2022

(65) Prior Publication Data

US 2023/0266287 A1     Aug. 24, 2023

(30) Foreign Application Priority Data

Feb. 24, 2022     (JP) ................................. 2022-026603

(51) Int. Cl.
*G01N 30/86* (2006.01)

(52) U.S. Cl.
CPC ................................. *G01N 30/8631* (2013.01)

(58) Field of Classification Search
None
See application file for complete search history.

(56) References Cited

U.S. PATENT DOCUMENTS

2016/0266074 A1* 9/2016 Ueno ..................... G01N 30/06

FOREIGN PATENT DOCUMENTS

CN       113252697 A       8/2021
EP         3327600 A2 *    5/2018   ........... G01N 23/223
(Continued)

OTHER PUBLICATIONS

"LabSolutions Insight GC/MS & LC/MS You Takentai Teiryou Shien Sofutouea: LabSolutions Insight (LabSolutions Insight: Multi-Analyte Quantification Software LabSolutions Insight for GC/MS & LC/MS)", [online], Shimadzu Corporation, [accessed on Feb. 1, 2022], the Internet <URL:https://www.an.shimadzu.co.jp/datanet/labsolutions/labsolutions-insight/features.htm>, 15 pages.
(Continued)

*Primary Examiner* — Daniel S Larkin
(74) *Attorney, Agent, or Firm* — Sughrue Mion, PLLC

(57) ABSTRACT

In a multi-analyte multi-component analysis, multiple kinds of numerical information are obtained for each sample as measurement and data-analysis results for multiple compounds. A threshold-based flag condition is set for each of two or more kinds of numerical information according to user operations. Multiple categories, each having a determination condition including the combination of the presence/absence of the flags corresponding to the two or more kinds of numerical information, are set according to user operations. For each sample-compound combination, each kind of numerical information is tested as to whether it satisfies the flag condition, and is flagged if it satisfies the condition. Each sample-compound combination is tested as to the presence/absence of the flags according to the determination condition of each category, to identify combinations belonging to any category. The identified combinations are displayed, with each combination related to the corresponding category or each category visually distinguished from the other.

6 Claims, 7 Drawing Sheets

MEASUREMENT UNIT
1
10  11  12
AUTO-SAMPLER → LC UNIT → MS UNIT

DATA PROCESSING UNIT — 2
DATA STORAGE SECTION — 20
CHROMATOGRAM CREATOR — 21
QUANTITATIVE ANALYZER — 22
ANALYZING TASK ASSISTANT — 23
FLAG CONDITION SETTER — 230
PASS-FAIL CONDITION SETTER — 231
PASS-FAIL DETERMINER — 232
ANALYSIS RESULT TABLE CREATOR — 233
DISPLAY PROCESSOR — 24

OPERATION UNIT — 3
DISPLAY UNIT — 4

(56) References Cited

FOREIGN PATENT DOCUMENTS

EP            3483600  A1  *   5/2019    .........  G01N 30/8675
JP            H07311616  A   *  11/1995

OTHER PUBLICATIONS

"LabSolutions Insight GCMS You Takentai Teiryou Shien Sofutouea (LabSolutions Insight: Multi-Analyte Quantification Software for GCMS)", [online], Shimadzu Corporation, [accessed on Feb. 1, 2022], the Internet <URL:https://www.an.shimadzu.co.jp/gcms/insight.htm>, 10 pages.
Communication dated Jul. 21, 2025 in Chinese Application No. 202211524670.4.
Shimadzu Corporation, "Shimadzu Launches LC-MS/MS Compatibility Update for LabSolutions Insight Software," Shimadzu.com, [Online], https://www.shimadzu.com.cn/newsinfo_contents/5981.html, Published: Sep. 24, 2015, pp. 2-22 (48 pages total).
Communication issued Nov. 17, 2025 in Chinese Application No. 202211524670.4.

* cited by examiner

Fig. 2

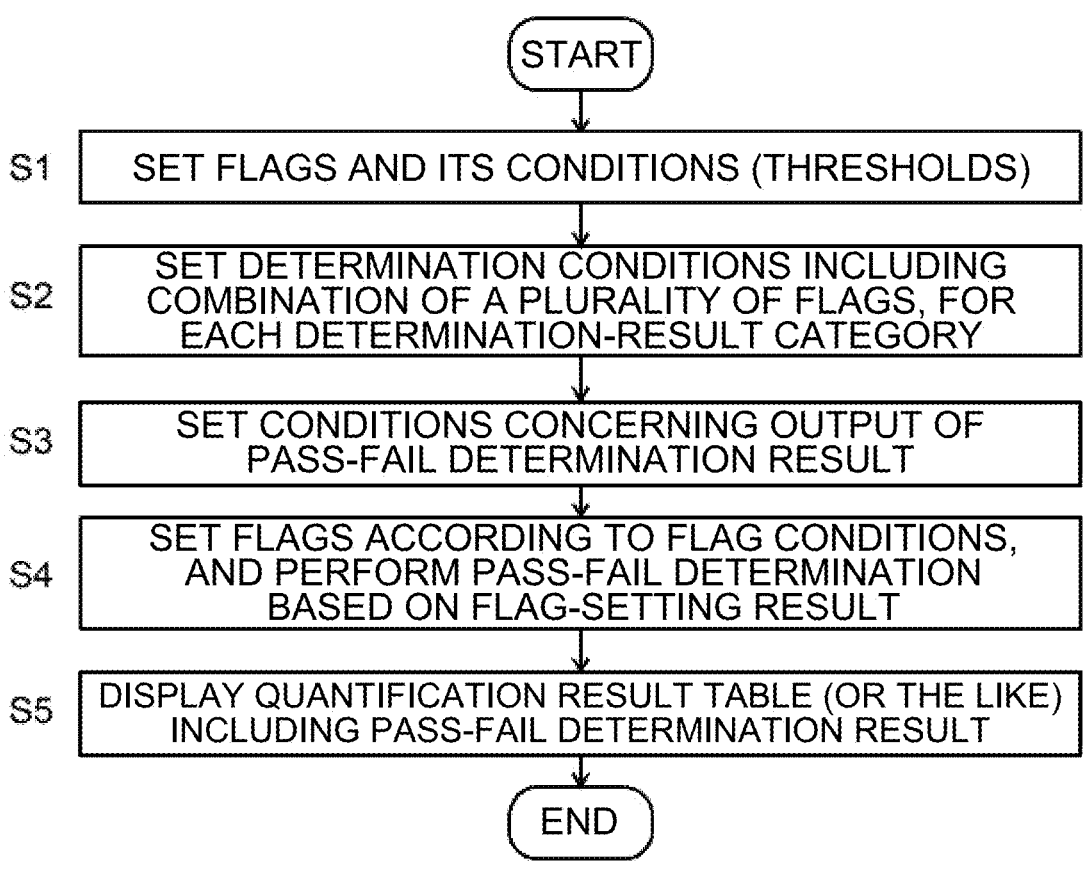

START

S1 | SET FLAGS AND ITS CONDITIONS (THRESHOLDS)

S2 | SET DETERMINATION CONDITIONS INCLUDING COMBINATION OF A PLURALITY OF FLAGS, FOR EACH DETERMINATION-RESULT CATEGORY

S3 | SET CONDITIONS CONCERNING OUTPUT OF PASS-FAIL DETERMINATION RESULT

S4 | SET FLAGS ACCORDING TO FLAG CONDITIONS, AND PERFORM PASS-FAIL DETERMINATION BASED ON FLAG-SETTING RESULT

S5 | DISPLAY QUANTIFICATION RESULT TABLE (OR THE LIKE) INCLUDING PASS-FAIL DETERMINATION RESULT

END

| # | Compound | m/z | RT | Low limit (warn) | Low limit |
|---|---|---|---|---|---|
| 1 | aaa | 256 | 1.15 | 2.5 | |
| 2 | bbb | 281 | 1.18 | 2.5 | |
| 3 | ccc | 312 | 1.25 | 2.5 | |
| 4 | ddd | 335 | 1.30 | 2.5 | |
| 5 | eee | 368 | 1.45 | 2.5 | |
| 6 | ggg | 401 | 1.52 | 2.5 | |
| 7 | hhh | 453 | 1.67 | 2.5 | |

Flags

Un-known | Standard | +/-

Pass-Fail Condition

Edit 52  53  5  50  51

Fig. 4

| Flags | Fail | Inconclusive |
|---|---|---|
| | All flags | One flag |
| Lower limit (warning) | ☐ | ☐ |
| Upper limit (warning) | ☐ | ☐ |
| Lower limit (caution) | ☐ | ☐ |
| Upper limit (caution) | ☐ | ☐ |
| Symmetry factor | ☐ | ☐ |

Pass-Fail Conditions for Unknown ☒

☐ Output string for "Pass": [ ]

☐ Output string for "Inconclusive": [ ]

☐ Output string for "Fail": [ ]

☐ Show determination color bar

[ Clear ]  [ OK ]  [ Cancel ]

Pass-Fail Conditions for Unknown

| Flags | Fail | Inconclusive |
|---|---|---|
| | All flags | One flag |
| Lower limit (warning) | ☐ | ☐ |
| Upper limit (warning) | ☑ | ☐ |
| Lower limit (caution) | ☐ | ☑ |
| Upper limit (caution) | ☐ | ☑ |
| Symmetry factor | ☑ | ☑ |

☐ Output string for "Pass": _____

☐ Output string for "Inconclusive": _____

☐ Output string for "Fail": _____

☑ Show determination color bar

| Clear | | OK | Cancel |

Fig. 7

| # | Flag | Flag ID | Compound Name | RT (measured) | Concentra-tion | Unit | Flag Pass/Fail | | m/z |
|---|---|---|---|---|---|---|---|---|---|
| 1 | | | aaa | 1.15 | 12.15 | ppb | Pass | | 256 |
| 2 | | | bbb | 1.18 | 12.32 | ppb | Pass | | 281 |
| 3 | | >L, TF | ccc | 1.25 | 13.25 | ppb | Fail | | 312 |
| 4 | | | ddd | 1.30 | 11.30 | ppb | Pass | | 335 |
| 5 | | | eee | 1.45 | 9.02 | ppb | Pass | | 368 |
| 6 | | | ggg | 1.52 | 10.52 | ppb | Pass | | 401 |
| 7 | | TF | hhh | 1.67 | 11.67 | ppb | Inconclusive | | 453 |
| 8 | | TF | iii | 1.78 | 9.25 | ppb | Pass | | 482 |
| 9 | | | jjj | 1.82 | 10.12 | ppb | Inconclusive | | 521 |

CHROMATOGRAPHIC ANALYZER AND PROGRAM FOR CHROMATOGRAPHIC ANALYSIS

TECHNICAL FIELD

The present invention relates to a chromatographic analyzer and a computer program to be used for a chromatographic analyzer. The "chromatographic analyzer" in the present description includes a liquid chromatographic analyzer (LC), gas chromatographic analyzer (GC), liquid chromatograph mass spectrometer (LC-MS), gas chromatograph mass spectrometer (GC-MS) and supercritical fluid chromatographic analyzer (SFC).

BACKGROUND ART

In recent years, a quantitative analysis of multiple components in multiple analytes employing an LC-MS or GC-MS (this type of analysis is hereinafter called a "multi-analyte multi-component quantification analysis") has been used in various areas, such as the testing of residual agricultural chemicals in foods, the testing of contaminants in environmental water, as well as pharmacokinetic studies and clinical tests in drug development. In general, the amount of measurement data (e.g., chromatogram data) acquired by a multi-analyte multi-component analysis is considerably large, and so is the amount of quantification results obtained by a quantitative analysis on those measurement data. Therefore, in order to improve the efficiency of an analyzing task performed by a user for the checking or verification of the measurement results or quantification results obtained for multiple components in multiple analytes, it is important to display the measurement results and quantification results by a simple operation, with a high level of efficiency, and in such a manner that the user barely mistakes one piece of information for another or misses a piece of important information.

As a software product for meeting those requirements, multi-analyte quantification software as disclosed in Non Patent Literatures 1 and 2 (or other related documents) has been available. As disclosed in Non Patent Literatures 1 and 2, this multi-analyte quantification software can comprehensively display various kinds of information on the screen, such as the quantification results of all samples, quantification results of all compounds, a two-dimensional table summarizing quantification results of all compounds in all samples, a chromatogram of each compound in each sample, and a calibration curve used for the quantification of each compound.

In a multi-analyte multi-component analysis, since the amount of information displayed in the aforementioned manner is extremely large, it is not easy for the user to understand which quantification result or peak detection result should be checked. Accordingly, the aforementioned multi-analyte quantification software is equipped with a flagging function for alerting the user by setting a colored flag for an analysis result or measurement result (e.g., a quantitative value) which has not exceeded a threshold previously set by the user. For example, Non Patent Literature 2 describes an example of the flagging criteria for water quality, in which a standard value of water quality concerning a causative substance of musty odor is defined as a "concentration value for warning", and one tenth of the standard value for water quality is defined as a "concentration value for caution". Quantitative values and chromatograms are colored in such a manner that a compound whose quantitative value exceeds one tenth of the standard value of water quality is colored orange, which indicates "caution needed", and a compound whose quantitative value exceeds the standard value of water quality is colored red, which indicates "warning".

CITATION LIST

Non Patent Literature

Non Patent Literature 1: "LabSolutions Insight GC/MS & LC/MS You Takentai Teiryou Shien Sofutouea: LabSolutions Insight (LabSolutions Insight: Multi-Analyte Quantification Software LabSolutions Insight for GC/MS & LC/MS)", [online], Shimadzu Corporation, [accessed on Feb. 1, 2022], the Internet
Non Patent Literature 2: "Lab Solutions Insight GCMS You Takentai Teiryou Shien Sofutouea (Lab Solutions Insight: Multi-Analyte Quantification Software for GCMS)", [online], Shimadzu Corporation, [accessed on Feb. 1, 2022], the Internet

SUMMARY OF INVENTION

Technical Problem

In a multi-analyte multi-component quantification analysis, various kinds of numerical information other than the quantitative value (e.g., concentration value) are obtained for each compound as measurement results or analysis results in the process of the measurement and data analysis, such as the peak area value, signal-to-noise ratio, symmetry factor (a coefficient showing the degree of symmetry of a peak), coefficient of determination of the calibration curve $(R^2)$, and retention-time difference (the difference between measured and standard retention times). The conventional multi-analyte quantification software mentioned earlier allows for the setting of a threshold for each of those different kinds of numerical information so that a flag can be set for an obtained numerical value which has exceeded the threshold.

However, for example, if a plurality of flags corresponding to different kinds of numerical information are set for one compound in one sample, it is difficult even for a skilled analysis operator to correctly interpret the result since the reason for a flag to be set varies depending on the kind of numerical information: there are various possibilities, such as the amount of compound in the sample being too large or too small, the measurement conditions being inappropriate, the device conditions being inappropriate, or the kind of standard sample used for preparing the calibration curve being inappropriate. Therefore, for example, when a flag is set for one kind of numerical information in one compound in one sample, the fact does not immediately allow the user to conclude that there is a problem with the sample itself. It is difficult to automatically judge the result.

In summary, although the conventional flagging function is suitable for helping users to quickly understand whether or not a specific kind of numerical information exceeds the threshold value, the same function is not always suitable for performing more complex tasks based on a plurality of kinds of numerical information, such as the task of evaluating the quality of a sample or sorting out samples that need a detailed examination by an individual in charge of the analysis.

On the other hand, the multi-analyte multi-component quantification analysis is often used for the screening of samples or similar routine. For such purposes, it is strongly demanded that an operator with no expert knowledge can automatically extract samples which are most likely to be defective, or extract samples which need a detailed check by a technician. It has been difficult for the conventional multi-analyte quantification software mentioned earlier to always satisfactorily meet those demands.

The present invention has been developed in view of the previously described problems. Its primary objective is to provide a chromatographic analyzer and a computer program for chromatographic analysis in which various kinds of numerical information obtained in the process of a measurement and data analysis can be properly and flexibly used so as to present relevant information in such a manner that the user can easily locate and efficiently check an analysis result which needs to be further checked by the user, or one which is unmistakably abnormal, among the results of a multi-analyte multi-component analysis.

Solution to Problem

One mode of the chromatographic analyzer according to the present invention developed for solving the previously described problem is a chromatographic analyzer configured to perform a measurement on a plurality of kinds of compounds for each of a plurality of samples, including:

a data-analysis processor configured to obtain, for each sample, a plurality of kinds of numerical information which are measurement results for a plurality of kinds of compounds and data-analysis results using the measurement results, based on data acquired by the measurement;

a flag condition setter configured to set, according to an operation by a user, a condition for giving a threshold-based flag to each of two or more kinds of numerical information among the plurality of kinds of numerical information;

a determination-result category setter configured to set, according to an operation by a user, a plurality of determination-result categories for each of which a combination of the presence or absence of the flags corresponding to the two or more kinds of numerical information is specified as a determination condition;

a determination processor configured to check, for each of the plurality of kinds of numerical information acquired for each sample and for each compound by the data-analysis processor, whether or not the numerical information satisfies a flag condition set by the flag condition setter, and to give the flag when the numerical information satisfies the flag condition, as well as to check for the presence or absence of the flags according to the determination conditions of the plurality of determination-result categories set by the determination-result category setter, and to identify a combination of the sample and the compound which belongs to any one of the plurality of determination-result categories; and a display processor configured to display the combination of the sample and the compound identified by the determination processor, in a form in which the combination is related to the determination-result category to which the combination belongs, or in a form which enables visual discrimination of the determination-result category concerned.

One mode of the program for chromatographic analysis according to the present invention developed for solving the previously described problem is a data-processing program to be used for a chromatographic analyzer configured to perform a measurement on a plurality of kinds of compounds for each of a plurality of samples, the program configured to cause a computer to perform:

a data-analysis processing step for obtaining, for each sample, a plurality of kinds of numerical information which are measurement results for a plurality of kinds of compounds and data-analysis results using the measurement results, based on data acquired by the measurement;

a flag condition setting step for setting, according to an operation by a user, a condition for giving a threshold-based flag to each of two or more kinds of numerical information among the plurality of kinds of numerical information;

a determination-result category setting step for setting, according to an operation by a user, a plurality of determination-result categories for each of which a combination of the presence or absence of the flags corresponding to the two or more kinds of numerical information is specified as a determination condition;

a determination processing step for checking, for each of the plurality of kinds of numerical information acquired for each sample and for each compound in the data-analysis processing step, whether or not the numerical information satisfies a flag condition set in the flag condition setting step, and to give the flag when the numerical information satisfies the flag condition, as well as to check for the presence or absence of the flags according to the determination conditions of the plurality of determination-result categories set in the determination-result category setting step, and to identify a combination of the sample and the compound which belongs to any one of the plurality of determination-result categories; and a display processing step for displaying, on a display section, the combination of the sample and the compound identified in the determination processing step, in a form in which the combination is related to the determination-result category to which the combination belongs, or in a form which enables visual discrimination of the determination-result category concerned.

Advantageous Effects of Invention

In the previously described modes of the chromatographic analyzer and the program for chromatographic analysis according to the present invention, each of a plurality of kinds of numerical values is given a flag which is set when the corresponding numerical value is greater or less than its threshold. By freely combining the flags given to those numerical values, it is possible to determine, for each combination of the sample and the compound, whether or not the combination belongs to any one of the determination-result categories, such as "pass", "fail" or "inconclusive". Then, each combination of the sample and the compound which belongs to one of those categories, i.e., "pass" or "fail", can be presented to the user in a visually easy-to-understand manner, for example, in a table of quantification results or in a chromatogram displayed for each sample and for each compound.

Thus, by using the previously described modes of the chromatographic analyzer and the program for chromatographic analysis according to the present invention, the user can efficiently and correctly (e.g., without missing a piece of important information) understand which result needs to be checked, which result is unmistakably abnormal, and which result is unmistakably normal in the results of a multi-analyte multi-component analysis. Once an individual with expert knowledge has appropriately set determination-result categories as well as their respective determination conditions and other related settings, even an operator with no expert knowledge can take charge of the task of analyzing quantification results.

BRIEF DESCRIPTION OF DRAWINGS

FIG. 2 is a flowchart showing one example of the procedure of a pass-fail determination process based on quantification results in the LC-MS system according to the present embodiment.

FIG. 4 is a diagram showing one example of a pass-fail condition setting screen in the LC-MS system according to the present embodiment.

FIG. 5 is a diagram showing the pass-fail condition setting screen in the LC-MS system according to the present embodiment, with the condition setting completed.

FIG. 7 is a diagram showing one example of a quantification result table for one sample in the LC-MS system according to the present embodiment.

DESCRIPTION OF EMBODIMENTS

An LC-MS system as one embodiment of the chromatographic analyzer according to the present invention is hereinafter described referring to the attached drawings.

Figure 1:
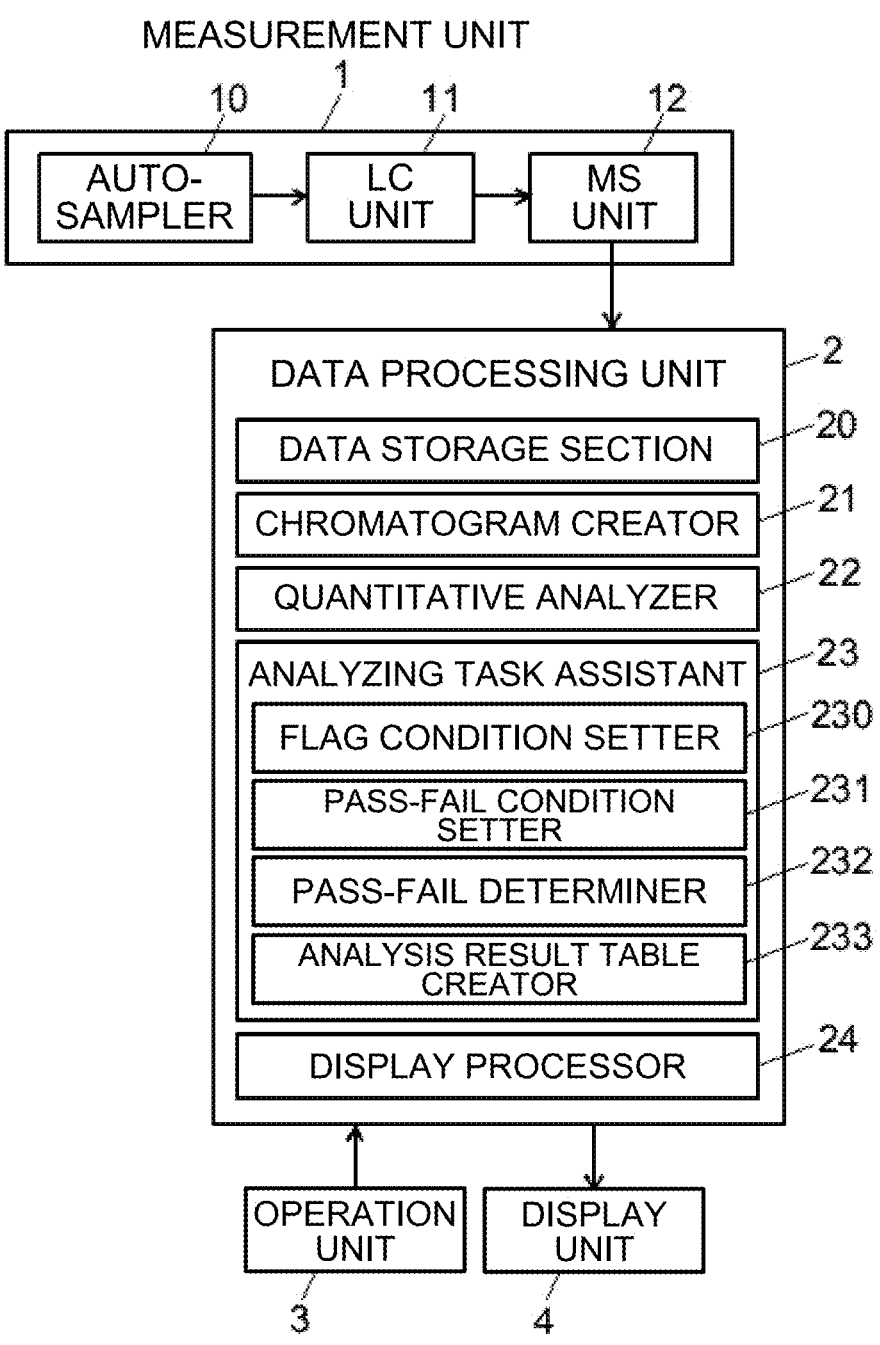
FIG. 1 is a schematic configuration diagram of an LC-MS system as one embodiment of the present invention.

FIG. 1 is a schematic configuration diagram of an LC-MS system according to the present embodiment.

This LC-MS system includes a measurement unit 1, data processing unit 2, operation unit 3 and display unit 4.

The measurement unit 1 includes an autosampler 10 having the function of selecting a large number of prepared samples in a predetermined order, a liquid chromatograph unit (LC unit) 11 configured to temporally separate compounds contained in a sample, as well as a mass spectrometry unit (MS unit) 12 configured to ionize a compound and detect the thereby produced ions. The following descriptions assume that the MS unit 12 is a single-type quadrupole mass spectrometer, although a tandem-type mass spectrometer can also be used, such as a triple quadrupole mass spectrometer or quadrupole time-of-flight mass spectrometer.

The data processing unit 2 includes, as its functional blocks, a data storage section 20, chromatogram creator 21, quantitative analyzer 22, analyzing task assistant 23 and display processor 24. The analyzing task assistant 23 includes, as its sub-functional blocks, a flag condition setter 230, pass-fail condition setter 231, pass-fail determiner 232, and analysis result table creator 233.

The data processing unit 2 can be created by using a personal computer including a CPU, RAM, ROM and other devices as hardware components, with at least some of its functions realized by executing, on the computer, a piece of dedicated data-processing software (computer program) installed on the same computer.

The computer program can be offered to users in the form of a non-transitory computer-readable record medium holding the program, such as a CD-ROM, DVD-ROM, memory card, or USB memory (dongle). The program may also be offered to users in the form of data transferred through the Internet or similar communication networks. The program can also be preinstalled on a computer (or more exactly, on a storage device as a component of a computer) as a part of a system before a user purchases the system.

Hereinafter initially given is a schematic description of a measurement operation performed in the measurement unit 1 when a multi-analyte multi-component quantification analysis is carried out in the LC-MS system according to the present embodiment. In this case, a plurality of (normally, a considerable number of) compounds to be subjected to the measurement are previously determined, and the retention time and the mass-to-charge ratio value m/z of the target ion are previously known for each compound. That is to say, those pieces information are given beforehand.

The autosampler 10 holds a large number of samples (analytes). Under the control of a control unit (not shown), the autosampler 10 sequentially selects those samples in a predetermined order and sends the selected sample to the LC unit 11. Though not shown, in the LC unit 11, a liquid-sending pump supplies a mobile phase to a column at a substantially constant flow velocity, and an injector injects a predetermined amount of sample into the mobile phase at a predetermined timing. The injected sample is carried by the mobile phase and introduced into the column. While the sample is passing through the column, the components in the sample are temporally separated from each other.

The eluate exiting from the exit end of the column is introduced into the MS unit 12. Though not shown, the MS unit 12 includes an ion source, which ionizes the compound in the eluate. The resulting ions are separated from each other by a quadrupole mass filter according to their m/z values, and an ion having a specific m/z value is selected by the mass filter and detected by an ion detector. The detection signals produced by the ion detector are converted into digital signals and sent to the data processing unit 2, in which those signals are stored in the data storage section 20.

In a quantitative analysis of multiple components, the quadrupole mass filter in the MS unit 12 is driven so as to selectively allow an ion having an m/z value corresponding to a target compound to pass through the same filter during a predetermined period of time around the retention time at which the target compound is introduced into the MS unit 12. In other words, a selected ion monitoring (SIM) measurement for the ion corresponding to the target compound is performed for each of the large number of target compounds. After an LC/MS measurement for a predetermined range of measurement time for one sample has been completed, the autosampler 10 selects the next sample and sends it to the LC unit 11. The LC unit 11 and the MS unit 12 repeat a similar LC/MS measurement to the previous description. In the case where a tandem mass spectrometer is used as the MS unit 12, an MRM measurement for a multiple reaction monitoring (MRM) transition corresponding to the target compound can be performed in place of the SIM measurement.

Thus, in the data storage section 20, a set of measurement data is stored for each sample, where the measurement data covers predetermined ranges of time each of which is defined around a retention time corresponding to one of the large number of target compounds, showing a temporal change of the intensity of an ion having a specific m/z value within each range of time. That is to say, a set of measurement data forming an extracted ion chromatogram (EIC) is stored. This set of data is used for the quantitative calculation of the target compounds.

Next, a multi-analyte multi-component quantification analysis performed in the data processing unit 2 is described.

In the data processing unit 2, the chromatogram creator 21 reads the measurement data corresponding to one sample from the data storage section 20 and creates an extracted ion chromatogram for each target compound. If a certain target compound is actually contained in the sample, a peak appears in the extracted ion chromatogram corresponding to that target compound. The quantitative analyzer 22 performs a peak-detecting process on each extracted ion chromatogram and calculates a peak area (or peak height) if a peak has been detected. Related numerical information is also calculated, such as the measured retention time corresponding to the peak-top position of the peak and the symmetry factor showing the degree of symmetry of the peak waveform. Referring to the calibration curve created by analyzing a standard sample, the quantitative analyzer 22 calculates the concentration value of each target compound from its peak area value. Thus, for each sample, the concentration values of the target compounds are obtained as the quantitative values.

The quantitative analyzer 22 stores the concentration value calculated for each target compound as well as the peak area value, measured retention time, symmetry factor and various other kinds of numerical information determined in the process of the calculation of the concentration value, in the data storage section 20 in such a manner that those pieces of information are related to the measurement data or saved in the file or folder in which the measurement data is also saved. It should be noted that the quantitative analysis by the quantitative analyzer 22 may be performed as a batch process after the completion of all measurements for the large number of samples, or as a sequential process for every completion of the measurement for one or more of the large number of samples (i.e., in the middle of the sequence of measurements).

In any case, after the multi-analyte multi-component quantification analysis has been completed, a huge amount of measurement data, quantification results and other related kinds of information for a large number of samples are held in the data storage section 20. In this state, a characteristic data-processing operation is performed, mainly by the analyzing task assistant 23, as will be hereinafter described referring to FIGS. 2-7.

Figure 3:
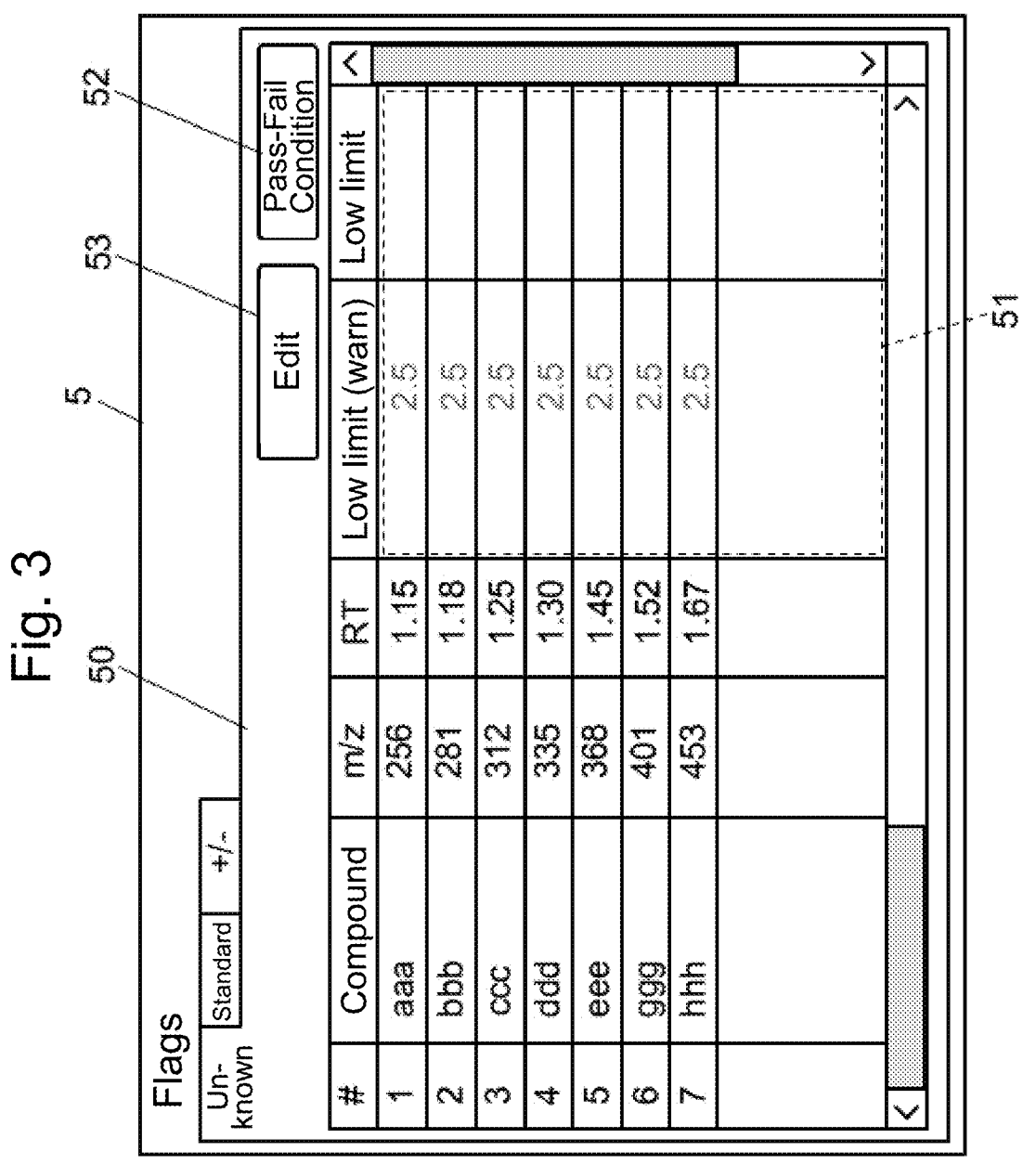
FIG. 3 is a diagram showing one example of the flag condition setting screen in the LC-MS system according to the present embodiment.
Figure 6:
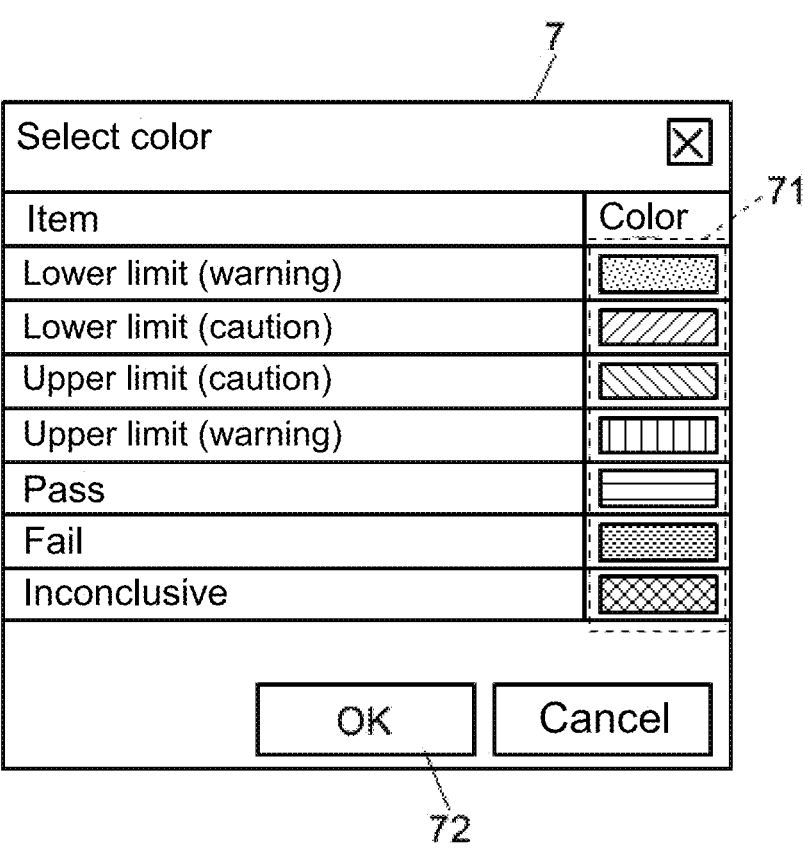
FIG. 6 is a diagram showing one example of a color bar setting screen for pass-fail determination results in the LC-MS system according to the present embodiment.

FIG. 2 is a flowchart showing one example of the procedure of the pass-fail determination process in the LC-MS system according to the present embodiment. FIG. 3 is a diagram showing one example of a flag condition setting screen. FIG. 4 is a diagram showing one example of a pass-fail condition setting screen. FIG. 5 is a diagram showing the pass-fail condition setting screen, with the condition setting completed. FIG. 6 is a diagram showing one example of a color bar setting screen for pass-fail determination results. FIG. 7 is a diagram showing one example of a quantification result table for one sample.

A user performs a predetermined operation using the operation unit 3. Then, the flag condition setter 230 displays a flag setting screen 5 as illustrated in FIG. 3 on the screen of the display unit 4 through the display processor 24. As shown in FIG. 3, the flag setting screen 5 includes a compound table 50 showing a list of compounds which are the target of the measurement. This compound table 50 shows, for each compound, the compound name, target m/z value for the measurement, and standard retention time, followed by an array of items for which flags can be set (pieces of numerical information to be obtained as measurement results or data-analysis results).

For example, the items for which flags can be set may be two or more of the following items of information: concentration value, peak area value, peak height value, signal-to-noise ratio, symmetry factor of the peak, retention-time difference, coefficient of determination of the calibration curve ($R^2$), accuracy percent representing the degree of discrepancy from a predetermined set value concerning the concentration, and ratio of ion intensities at a plurality of m/z values. In the present case, since the primary purpose is the quantitative analysis, the concentration value is the most important numerical information. Therefore, two levels of flags are provided for each of the upper and lower limits of the concentration value, i.e., the "caution" level for urging the user to check the concentration value and the "warning" level for indicating that there may possibly be a serious problem with the concentration value itself or in the process of the calculation or measurement of the concentration value. That is to say, there are four flags concerning the concentration: "concentration upper limit (caution)", "concentration upper limit (warning)", "concentration lower limit (caution)" and "concentration lower limit (warning)". Based on the four thresholds respectively set for those flags, concentration values can be classified into five levels, one of which corresponds to "no flag".

Flags can be set for each sample type and for all compounds. The sample type indicates the kind of sample, such as an unknown sample or standard sample. In the flag setting screen shown in FIG. 3, the sample type can be specified by a tab-switching operation. A clicking operation on the "Edit" button 53 by the user through the operation unit 3 enables the threshold field 51 for an input of each item. In this field, the user appropriately inputs or modifies the thresholds for each compound, whereby the items for which flags are given are selected, and the conditions (thresholds) for giving the flags are specified (Step S1).

In the example of FIG. 3, the concentration lower limit (warning) flag is set for each of the seven compounds having the compound names of "aaa", ... and "hhh". The thresholds are all 2.5. The user can also appropriately set flags for other items. The manner of the setting of the flags described thus far is similar to the manner in the case of the conventional LC-MS using the previously mentioned multi-analyte quantification software.

After all desired flags have been set, the user performs a clicking operation with the operation unit 3 on the "Pass-Fail Condition" button 52 on the flag setting screen 5. In response to this operation, the pass-fail condition setter 231 displays a pass-fail condition setting screen 6 as illustrated in FIG. 4 on the display unit 4. The pass-fail condition setting screen 6 includes a pass-fail condition setting table 60 and a pass-fail determination result output condition setting section 61. In the pass-fail condition setting table 60, the kinds of flags which are set at the moment are vertically arranged, with each flag provided with checkboxes for selecting, for each of the two determination-result categories of "fail" and "inconclusive", whether or not the flag should be added to the determination conditions for the category concerned.

In normal cases, "fail" is the category for a determination result in which the data is likely to be abnormal due to some factors, as in the case where the quantification result of the sample has a problem in view of the purpose of the measurement (e.g., when a marker substance that exceeds a reference value of the metabolic syndrome has been detected in a measurement for a physical checkup), or the case where there is a problem with the signal processing or calculation based on the data obtained for the sample (e.g., when the symmetry factor exceeds the threshold), or the case where there is a fundamental problem with the measurement on the sample (e.g., when the signal-to-noise ratio is lower than the threshold, or there is a significant discrepancy in retention time, or no peak can be detected).

"Inconclusive" is the category for a determination result which cannot be categorized as "failed" yet may possibly have a problem with the data. For example, when the concentration value is considerably lower than the threshold and the retention time is considerably displaced from the set value, the result will be considered as "failed" with a high level of certainty. By comparison, in the case where the concentration value is lower than the threshold and yet the retention time is correct, the measurement itself may possibly have been correctly performed. In that case, whether or not there is a problem cannot be definitely determined without checking the waveform of the chromatogram. "Inconclusive" is useful as the determination result in such a case. All results which are categorized as neither "failed" nor "inconclusive" can be categorized as "passed" even when a flag is set.

In the present example, judging a result as "failed" requires all specified flags to be set (i.e., logical multiplication), while judging a result as "inconclusive" merely requires at least one of the specifies flags to be set (i.e., logical addition). These condition settings may be appropriately changed. In the case where all specified flags need to be set for judging a result as "failed", it is not permitted to include both the "warning" flag and the "caution" flag having the same directionality (upward for the upper limit, and downward for the lower limit) in the condition setting. For example, it is not permitted to specify both the flag of the "concentration upper limit (warning)" and that of the "concentration upper limit (caution)". This constraint is necessary since a plurality of flags having the same directionality cannot be simultaneously given.

The user selects flags to be included in the determination conditions, by performing the operation of checking one or both of the "Fail" and "Inconclusive" boxes on the pass-fail condition setting screen 6 (Step S2). FIG. 5 shows an example of the selection of the flags to be included in the determination conditions. In this example, a result for which both the flag of the "concentration upper limit (warning)" and that of the "symmetry factor" are set is concluded to be "failed". A result for which one of the three flags of "concentration lower limit (caution)", "concentration upper limit (caution)" and "symmetry factor" is set is concluded to be "inconclusive".

Next, the user sets conditions concerning the output (display) of the pass-fail determination result on the pass-fail condition setting screen 6 (Step S3). Specifically, "Fail", "Inconclusive" and "Pass" are set as the default output strings for the determination results "fail", "inconclusive" and "pass", respectively. A user who wants to use other output strings should check one or more of the three uppermost boxes in the pass-fail determination result output condition setting section 61 and enter a string or strings that should be displayed. It is also possible to provide an option which disables the usage of strings for showing the determination results.

A user who wants to use not only strings but also colors for displaying the determination result should check the box of "Show determination color bar" and perform a predetermined operation. Then, the pass-fail condition setter 231 displays a display color selection screen 7 as illustrated in FIG. 6 on the display unit 4. In the color selection field 71 in this screen, the user can select a color to be used for each of the determination results "fail", "inconclusive" and "pass". After the completion of the selection, the user clicks the "OK" button 72, whereby the selected colors are registered. When the "OK" button 62 on the pass-fail condition setting screen 6 is clicked by the user, the pass-fail conditions which have been set at that moment are registered.

With the flag condition setting and the pass-fail condition setting thus completed, the user performs a predetermined operation using the operation unit 3. Then, the pass-fail determiner 232 retrieves the pieces of numerical information which are the measurement results and data-analysis results stored in the data storage section 20, evaluates the information according to the flag setting conditions registered in the previously described manner, and gives a flag for each piece of numerical information which satisfies the set conditions. Furthermore, the pass-fail determiner 232 checks for the presence or absence of the set flags according to the registered pass-fail conditions to identify combinations of samples and compounds which should be categorized as "failed" and those which should be categorized as "inconclusive". The other combinations of samples and compounds are concluded to be "passed" (Step S4).

The analysis result table creator 233 creates various tables, such as a table created for each sample to show pieces of numerical information which are the data-analysis results and measurement results respectively related to all compounds, a table created for each compound to show pieces of numerical information which are the data-analysis results and measurement results respectively related to all samples, and a table created for each kind of numerical information that is one data-analysis result or one measurement result, to show a specific kind of numerical information for each of all combinations of samples and compounds. The table additionally includes a field showing information of the flags which have been given in the previously described manner and a field showing the result of the pass-fail determination based on the flags. The display processor 24 displays a data-analysis result screen including the created quantification result table on the display unit 4 (Step S5).

In the data-analysis result screen including the quantification result table, other related pieces of information may be displayed along with the table, such as a peak waveform of an extracted ion chromatogram corresponding all or some of the compounds in a specific sample, or the calibration curve used for calculating the concentration.

FIG. 7 shows one example of the table created for one sample to show pieces of numerical information for each compound.

In the quantification result table shown in FIG. 7, a compound for which a flag has been set has a flag mark shown in the "Flag" column. The "Flag ID" column shows a code which represents the type of flag. The "RT (measured)" and "Concentration" columns show the measured retention time and the concentration value for each compound. The "Flag Pass/Fail" column shows one of the three strings of "Pass", "Fail" and "Inconclusive", as well as a rectangular mark filled with a color as specified in the determination color bar. As for the compound "ccc" which has been concluded to be "failed", the piece of numerical information which has been given a flag and thereby caused the compound to be concluded to be "failed", i.e., the concentration value in the present example, has a background filled with a display color assigned to the determination result "fail".

As noted earlier, in the LC-MS system according to the present embodiment, the pass-fail determination result is individually shown for each sample and for each compound in the quantification result table. By viewing this table, the user can quickly understand which sample contains a compound that has been "failed" or requires further checking, and what kind of compound it is. Therefore, for example, even an operator with no expert knowledge can perform the task of selectively extracting "failed" samples or extract combinations of samples and compounds that require further checking and forward this result to another individual who has expert knowledge.

In the LC-MS system according to the present embodiment, a different combination of flags can be set as the determination condition for each of the different determination-result categories, such as "fail", "inconclusive" and "pass". This makes the system flexible and extendable so that the user can understand various states according to the content and purpose of the determination-result category. In normal cases, setting flags for various items of information makes it difficult to understand, from the state of the set flags, whether it is a problem with the sample itself or one with the device or measurement conditions. The LC-MS system according to the present embodiment can solve this problem since the user can comprehensively judge a plurality of kinds of flags, so that a situation with abnormality or problem can be easily recognized.

The present system can also perform the filtering by a determination-result category, such as "fail", "inconclusive" or "pass", to display only samples, compounds or combinations of samples and compounds included in a specific determination-result category. Even when some quantification results obtained by the filtering are selectively displayed in this manner, the presence or absence of other flags that are not directly related to the filtering are also visible on the display, so that the user can check the presence or absence of those other flags even in the results which have been narrowed down.

After the quantification result table as shown in FIG. 7 has been displayed, the user can once more return to the flag setting screen 5 and adjust one or more thresholds for the flagging. In that case, a modification to a threshold causes a change in the presence or absence of the flag as well as the pass-fail determination results based on the flags. This function can be used, for example, to adjust the flagging conditions so that the data-analysis result for a specific compound in a specific sample will be concluded to be "failed".

In the LC-MS system according to the present embodiment, the pass-fail determination conditions are defined for each of the two determination-result categories, i.e., "fail" and "inconclusive", while results which do not satisfy any of those conditions are categorized as "passed". The names of those determination-result categories can be appropriately changed. The system may even allow users to freely set those names. For example, in the case of a quantitative analysis for the testing of residual agricultural chemicals, "fail" may be replaced by "suspension of shipments". In the case of a quantitative analysis for a physical checkup, "fail" may be replaced by "treatment required". Thus, the categories can be named according to the purpose of the analysis.

Although the previous embodiment is an example in which the present invention is applied in an LC-MS, it is evident that the present invention can be generally applied in any chromatograph system which can acquire a chromatogram and perform a quantitative analysis based on that chromatogram. In other words, the present invention is applicable not only in an LC-MS but also in a wide range of devices, including GC-MS, LC, GC and SFC.

The previous embodiment and its various modified examples described thus far are mere examples of the present invention. Any modification, change or addition appropriately made within the gist of the present invention will naturally fall within the scope of claims of the present application.

Various Modes

It is evident for a person skilled in the art that the previously described illustrative embodiment is a specific example of the following modes of the present invention.

(Clause 1) One mode of the chromatographic analyzer according to the present invention is a chromatographic analyzer configured to perform a measurement on a plurality of kinds of compounds for each of a plurality of samples, including:

a data-analysis processor configured to obtain, for each sample, a plurality of kinds of numerical information which are measurement results for a plurality of kinds of compounds and data-analysis results using the measurement results, based on data acquired by the measurement;

a flag condition setter configured to set, according to an operation by a user, a condition for giving a threshold-based flag to each of two or more kinds of numerical information among the plurality of kinds of numerical information;

a determination-result category setter configured to set, according to an operation by a user, a plurality of determination-result categories for each of which a combination of the presence or absence of the flags corresponding to the two or more kinds of numerical information is specified as a determination condition;

a determination processor configured to check, for each of the plurality of kinds of numerical information acquired for each sample and for each compound by the data-analysis processor, whether or not the numerical information satisfies a flag condition set by the flag condition setter, and to give the flag when the numerical information satisfies the flag condition, as well as to check for the presence or absence of the flags according to the determination conditions of the plurality of determination-result categories set by the determination-result category setter, and to identify a combination of the sample and the compound which belongs to any one of the plurality of determination-result categories; and a display processor configured to display the combination of the sample and the compound identified by the determination processor, in a form in which the combination is related to the determination-result category to which the combination belongs, or in a form which enables visual discrimination of the determination-result category concerned.

(Clause 4) One mode of the program for chromatographic analysis according to the present invention is a data-processing program to be used for a chromatographic analyzer configured to perform a measurement on a plurality of kinds of compounds for each of a plurality of samples, the program configured to cause a computer to perform:

a data-analysis processing step for obtaining, for each sample, a plurality of kinds of numerical information which are measurement results for a plurality of kinds of compounds and data-analysis results using the measurement results, based on data acquired by the measurement;

a flag condition setting step for setting, according to an operation by a user, a condition for giving a threshold-based flag to each of two or more kinds of numerical information among the plurality of kinds of numerical information;

a determination-result category setting step for setting, according to an operation by a user, a plurality of determination-result categories for each of which a combination of the presence or absence of the flags corresponding to the two or more kinds of numerical information is specified as a determination condition;

a determination processing step for checking, for each of the plurality of kinds of numerical information acquired for each sample and for each compound in the data-analysis processing step, whether or not the numerical information satisfies a flag condition set in the flag condition setting step, and to give the flag when the numerical information satisfies the flag condition, as well as to check for the presence or absence of the flags according to the determination conditions of the plurality of determination-result categories set in the determination-result category setting step, and to identify a combination of the sample and the compound which belongs to any one of the plurality of determination-result categories; and a display processing step for displaying, on a display section, the combination of the sample and the compound identified in the determination processing step, in a form in which the combination is related to the determination-result category to which the combination belongs, or in a form which enables visual discrimination of the determination-result category concerned.

The chromatographic analyzer according to Clause 1 includes a liquid chromatographic analyzer, gas chromatographic analyzer, liquid chromatograph mass spectrometer, gas chromatograph mass spectrometer and supercritical fluid chromatographic analyzer.

In the chromatographic analyzer according to Clause 1 and the program for chromatographic analysis according to Clause 4, each of a plurality of kinds of numerical values is given a flag which is set when the corresponding numerical value is greater or less than its threshold. By freely combining the flags given to those numerical values, it is possible to determine, for each combination of the sample and the compound, whether or not the combination belongs to any one of the determination-result categories, such as "pass", "fail" or "inconclusive". Then, each combination of the sample and the compound which belongs to one of those categories, i.e., "pass" or "fail", can be presented to the user in a visually easy-to-understand manner, for example, in a table of quantification results or in a chromatogram displayed for each sample and for each compound.

Thus, by using the chromatographic analyzer according to Clause 1 and the program for chromatographic analysis according to Clause 4, the user can efficiently and correctly (e.g., without missing a piece of important information) understand which result needs to be checked, which result is unmistakably abnormal, and which result is unmistakably normal in the results of a multi-analyte multi-component analysis. Once an individual with expert knowledge has appropriately set determination-result categories as well as their respective determination conditions and other related settings, even an operator with no expert knowledge can take charge of the task of analyzing quantification results.

(Clause 2) In the chromatographic analyzer according to Clause 1, the plurality of determination-result categories may include at least a determination-result category for analysis results which are passed or a determination-result category for analysis results which are failed, and a different determination-result category for analysis results which are neither passed nor failed.

(Clause 5) In the program for chromatographic analysis according to Clause 4, the plurality of determination-result categories may include at least a determination-result category for analysis results which are passed or a determination-result category for analysis results which are failed, and a different determination-result category for analysis results which are neither passed nor failed.

For example, the "different determination-result category" may be a determination-result category corresponding to an instruction for urging a user to check information other than the numerical information, such as a chromatogram waveform or calibration curve.

By the chromatographic analyzer according to Clause 2 and the program for chromatographic analysis according to Clause 5, combinations of samples and compounds which require the checking of chromatogram waveforms or other related tasks can be extracted based on a criterion totally different from the pass-fail criterion.

(Clause 3) In the chromatographic analyzer according to Clause 1 or 2, each of the plurality of determination-result categories may be related to a color specified by a user, and the display processor may be configured to display the combination of the sample and the compound in the color related to the determination-result category to which the combination belongs.

(Clause 6) In the program for chromatographic analysis according to Clause 4 or 5, each of the plurality of determination-result categories may be related to a color specified by a user, and the display processing step may include displaying the combination of the sample and the compound in the color related to the determination-result category to which the combination belongs.

In the chromatographic analyzer according to Clause 3 and the program for chromatographic analysis according to Clause 6, the user can easily locate a sample or compound belonging to a specific determination-result category, such as "pass", "fail" or "inconclusive", in a quantification result table (or the like) in which concentration values and other numerical values are listed, for example.

REFERENCE SIGNS LIST

1 . . . Measurement Unit
10 . . . Autosampler
11 . . . Liquid Chromatograph Unit (LC Unit)
12 . . . Mass Spectrometry Unit (MS Unit)
2 . . . Data Processing Unit
20 . . . Data Storage Section
21 . . . Chromatogram Creator
22 . . . Quantitative Analyzer
23 . . . Analyzing Task Assistant
230 . . . Flag Condition Setter
231 . . . Pass-Fail Condition Setter
232 . . . Pass-Fail Determiner
233 . . . Analysis Result Table Creator
24 . . . Display Processor
3 . . . Operation Unit
4 . . . Display Unit

The invention claimed is:

1. A chromatographic analyzer configured to perform a measurement on a plurality of kinds of compounds for each of a plurality of samples, comprising:

a data-analysis processor configured to obtain, for each sample, a plurality of kinds of numerical information which are measurement results for a plurality of kinds of compounds and data-analysis results using the measurement results, based on data acquired by the measurement;

a flag condition setter configured to set, according to an operation by a user, a condition for giving a threshold-based flag to each of two or more kinds of numerical information among the plurality of kinds of numerical information;

a determination-result category setter configured to set, according to an operation by a user, a plurality of determination-result categories for each of which a combination of a presence or absence of the flags corresponding to the two or more kinds of numerical information is specified as a determination condition;

a determination processor configured to check, for each of the plurality of kinds of numerical information acquired for each sample and for each compound by the data-analysis processor, whether or not the numerical information satisfies a flag condition set by the flag condition setter, and to give the flag when the numerical information satisfies the flag condition, as well as to check for the presence or absence of the flags according to the determination conditions of the plurality of determination-result categories set by the determination-result category setter, and to identify a combination of the sample and the compound which belongs to any one of the plurality of determination-result categories; and a display processor configured to display the combination of the sample and the compound identified by the determination processor, in a form in which the combination is related to the determination-result category to which the combination belongs, or in a form which enables visual discrimination of the determination-result category concerned.

2. The chromatographic analyzer according to claim 1, wherein the plurality of determination-result categories include at least a determination-result category for analysis results which are passed or a determination-result category for analysis results which are failed, and a different determination-result category for analysis results which are neither passed nor failed.

3. The chromatographic analyzer according to claim 1, wherein each of the plurality of determination-result categories is related to a color specified by a user, and the display processor is configured to display the combination of the sample and the compound in the color related to the determination-result category to which the combination belongs.

4. A non-transitory computer-readable storage medium holding a program for chromatographic analysis which is a data-processing program to be used for a chromatographic analyzer configured to perform a measurement on a plurality of kinds of compounds for each of a plurality of samples, wherein the program is configured to cause a computer to perform:

a data-analysis processing step for obtaining, for each sample, a plurality of kinds of numerical information which are measurement results for a plurality of kinds of compounds and data-analysis results using the measurement results, based on data acquired by the measurement;

a flag condition setting step for setting, according to an operation by a user, a condition for giving a threshold-based flag to each of two or more kinds of numerical information among the plurality of kinds of numerical information;

a determination-result category setting step for setting, according to an operation by a user, a plurality of determination-result categories for each of which a combination of a presence or absence of the flags corresponding to the two or more kinds of numerical information is specified as a determination condition;

a determination processing step for checking, for each of the plurality of kinds of numerical information acquired for each sample and for each compound in the data-analysis processing step, whether or not the numerical information satisfies a flag condition set in the flag condition setting step, and to give the flag when the numerical information satisfies the flag condition, as well as to check for the presence or absence of the flags according to the determination conditions of the plurality of determination-result categories set in the determination-result category setting step, and to identify a combination of the sample and the compound which belongs to any one of the plurality of determination-result categories; and a display processing step for displaying, on a display section, the combination of the sample and the compound identified in the determination processing step, in a form in which the combination is related to the determination-result category to which the combination belongs, or in a form which enables visual discrimination of the determination-result category concerned.

5. The non-transitory computer-readable storage medium holding a program for chromatographic analysis according to claim 4, wherein the plurality of determination-result categories include at least a determination-result category for analysis results which are passed or a determination-result category for analysis results which are failed, and a different determination-result category for analysis results which are neither passed nor failed.

6. The non-transitory computer-readable storage medium holding a program for chromatographic analysis according to claim 4, wherein each of the plurality of determination-result categories is related to a color specified by a user, and the display processing step includes displaying the combination of the sample and the compound in the color related to the determination-result category to which the combination belongs.

* * * * *